Dec. 16, 1947.  H. C. BEHRENS  2,432,497
CUT-OFF MECHANISM
Filed Oct. 4, 1945
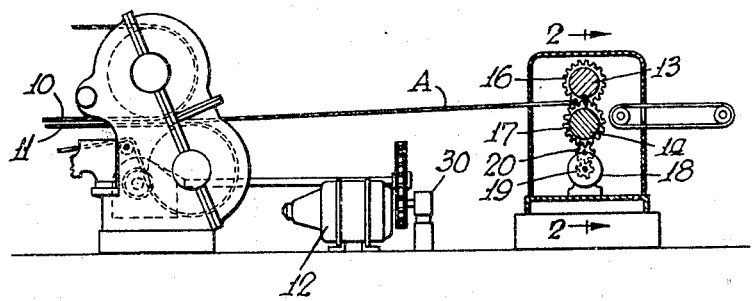
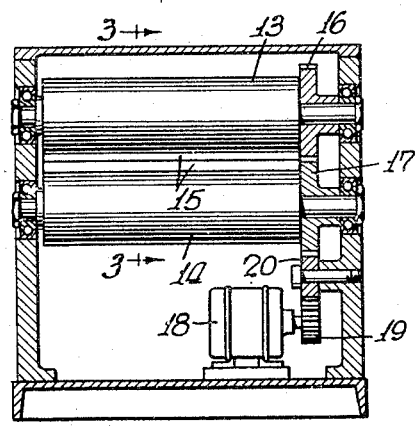
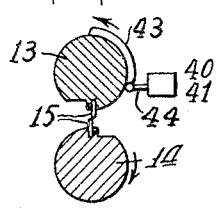
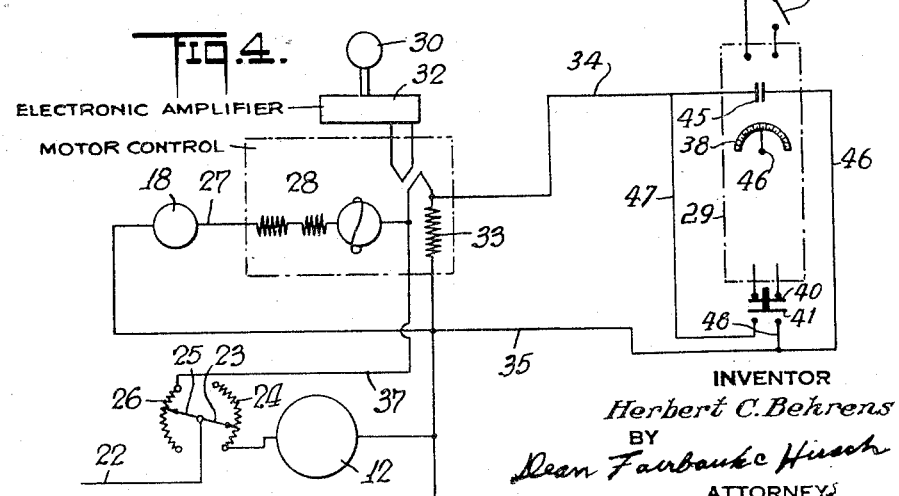
INVENTOR
*Herbert C. Behrens*
BY
*Dean Fairbanks Hirsch*
ATTORNEYS Patented Dec. 16, 1947

2,432,497

UNITED STATES PATENT OFFICE 2,432,497

CUTOFF MECHANISM

Herbert C. Behrens, Haddon Heights, N. J., assignor to Samuel M. Langston Co., Camden, N. J., a corporation of New Jersey Application October 4, 1945, Serial No. 620,215

13 Claims. (Cl. 164—68)

1

In the manufacture of double faced corrugated board, such for instance as that used in making blanks for shipping boxes, it is the usual practice to continuously produce the stiff sheet or board and continuously deliver it to a cut-off mechanism which subdivides it into sections or blanks, the length of which is predetermined in accordance with the periphery of the container to be made from said sections. Thus, for a given sheet speed, the frequency of the cutting operation must be adjusted for each blank length. In commercial practice these lengths are in the general range of 30 to 120 inches. In order to make a clean cut, the knife or other cutter should travel with and at the same speed as the advancing sheet during the cutting operation, and then move out of the path of the sheet and return to a position for reentering the sheet for the next cut. Thus, for a given sheet speed, the cutting speed must remain substantially constant, but the return speed must be varied in accordance with the length of the blanks being cut to permit the desired time interval for the sheet to pass the cut-off mechanism to a distance equal to the length of the desired section between successive cuts. This return speed must be adjusted after the cutting of the required number of blanks of one length to give the proper time cycle for cutting the next batch of blanks of a different length.

It is common practice to use a variable speed drive, such for instance as a Reeves drive, for varying the time cycle of the cutter, and to use in combination therewith some form of cutter actuating mechanism which will hold the cutter speed constant, and the same as that of the sheet speed while cutting, but decelerate and then accelerate the cutter betwen successive cuts. The time cycle and the return speed in the cycle must be adjusted and preferably simultaneously for each change in sheet speed and for each blank length for a given sheet speed.

In my prior Patent 2,394,589, I have shown and claimed a machine of this type, in which the Reeves drive of the cutter is omitted and two separate electric motors are employed, one for driving the sheet feeding mechanism and the other for driving the cutter through mechanism which alternately accelerates and decelerates the cutter between successive cutting actions. In the embodiment shown the two motors are simultaneously controlled by a double rheostat, and the motor for the cutter is independently controlled by a single rheostat in series with a part of the double rheostat.

2

The mechanism which effects the alternate acceleration and deceleration of the cutter while the driving motor is running at uniform speed, may be of the type shown in my prior Patent 2,262,913. Such a mechanism is costly, subject to wear, required mechanical adjustment for different sheet lengths, and substantially increases the overall size and weight of the cutter unit.

The main object of the present invention is to secure accurate control of the varying speed of the cutter in its cycle by electrical rather than mechanical means, thereby eliminating the accelerating and decelerating mechanism and all of the objections and disadvantages incidental thereto.

A further object of the invention is to provide means for controllably accelerating and decelerating the motor and the cutter driven thereby, and between successive cutting actions, instead of accelerating and decelerating the cutter in respect to a motor running at constant speed.

In the accompanying drawings:

Fig. 1 is a partial side elevation of a portion of a machine embodying my invention.

Fig. 2 is a vertical section on the line 2—2 of Fig. 1, but on a larger scale.

Fig. 3 is a vertical section through the cutters on the line 3—3 of Fig. 2, and

Fig. 4 is a wiring diagram of the motor controlling circuit.

In the drawing there is shown a portion of the delivery end of a conventional double facer in which the stiff sheet A is delivered by a pair of belts 10 and 11 passing over pulleys which may be driven by a motor 12. The sheet passes between the cutter shafts 13 and 14 having interengaging blades 15 and meshing gears 16 and 17. For driving the cutter mechanism there is provided a motor 18 connected in any suitable manner to the gear 17, as for instance by a pinion 19 and an idler 20.

The present invention relates to the means for controlling the speeds of the motors 12 and 18 so that the motor 12 may run at any desired constant speed to deliver the sheet at a uniform rate, and the motor 18 is driven so that once during each complete revolution of the cutter shafts 13 and 14 the cutter blades while engaging the sheet will travel at substantially the same speed as the sheet, but when the cutters are out of engagement with the sheet the speed of the cutter shafts may be varied so as to vary the time cycle and to permit a greater or lesser length of sheet to pass through the cutter between successive cutting actions. Thus sections of any desired length may be cut from the sheet, but there will be no buckling or tearing of the sheet at the time of cutting, because the cutters will then be traveling at the same speed as the sheet. This is important in connection with double faced corrugated board and other such relatively stiff material which is continuously produced, and which cannot be readily bent or folded.

The electric circuit and circuit controllers employed in varying the time cycle of the motor 18 simultaneously with any variation in the time cycle of the motor 12, and for accelerating and decelerating the motor 18 during each successive cutting cycle, may be as diagrammatically illustrated in Fig. 4. The operating current from any suitable current source may be delivered through lines 21 and 22. The line 21 is connected to one terminal of the motor 12 and to one terminal of the motor 18. The other line 22 is connected to a double rheostat including an arm 23 contacting a variable resistance 24 leading to the other terminal of the motor 12, and an arm 25 contacting a variable resistance 26 which, together with other parts hereinafter described, controls the current supplied to the motor 18.

So far as concerns certain broad aspects of the invention, the line 27 from the other terminal of the motor 18 may be controlled by a rheostat separate from the double rheostat above referred to, and in series with the resistance 26, and means may be provided for automatically operating the arm of such rheostat to accelerate and decelerate the motor 18 in its cutting cycle, and for varying the length of the time cycle in accordance with the length of the sheet to be cut. Preferably there is employed an amplidyne 28 and an electric timer 29, the amplidyne being controlled from a pilot generator 30 driven by the main motor 12, and the electric timer being controlled by a potentiometer 31. As shown, the pilot generator 30 is driven from the shaft of the motor 12, so that its speed will vary directly with the sheet speed, and the current of this pilot generator is delivered to an electronic amplifier 32 and the current from this employed in the reference field of the amplidyne. The current from the variable resistance 26 passes through the amplidyne and a resistance 33 and back to the line 21. The timer 29 cuts the resistor 33 in and out of series with line 21 to effect change in the speed of the motor 18 through amplidyne 28. The electric timer 29 has lines 34 and 35 connected to opposite sides of the resistance 33.

The timer is supplied with alternating current through lines 36 controlled by switch 37, and is provided with a double switch having blades 40 and 41 connected together and insulated from each other. This switch is controlled by cam 43 on, or operating in timed relationship with, one of the cutters 13 and 14, so that the operating member of the switch rides off the cam at the instant of cutting, the cutter is slowed down from sheet speed for a variable period depending upon the setting of the timer. It rides on again at a fixed point in advance of the next cutting operation, and while on, the cutter is brought up to sheet speed.

As the sheet is cut and the operating member 44 rides off the cam it raises the blade 40 to close the circuit through the blade 40 and initiate the time cycle. This causes contacts 45, which are integral to the timer, to open the circuit through lines 34, 46 and 35, to place the resistance 33 in the amplidyne field circuit and cause the cutters to slow down immediately after the cutting action.

The length of time during which this slowing down takes places is dependent upon the sheet length indicated by a pointer movable over a scale 38 calibrated in sheet lengths. This pointer is operated by knob 46 which varies a resistance coil in the timer and determines the length of time contacts 45 remain open. The slowing down may be reduced to zero for the shortest sheet lengths when the cutter rotates at a constant speed, in which case contacts 45 remain closed throughout the cycle. The slowing down may be for a maximum period for the longest sheet lengths and until the cam 43 recycles the timer. The slow down period will usually be somewhere between these two extremes, in which case at the end of the time period contacts 45 will close causing the cutters to speed up to paper speed.

When the cam again engages the operating member 44 the double switch is lowered and the blade 41 closes the circuit through lines 34, 47, 48 and 35, taking over the short circuiting of the resistance 33 from contacts 45, so that the amplidyne will continue to drive the cutters at high speed without interruption, and so that when they come together they will be traveling at paper speed. To avoid any interruption of the high speed, contacts 41 must close before 40 opens to recycle the timer. At the instant of cutting the operating member of switch 44 again rides off the cam and the blade 41 ceases to shunt out the resistance 33 through the line 47. The closing of the timer circuit by the blade 40 when the operating member of the switch rides off the cam, again closes the timer circuit and the cycle is repeated.

The details of the amplifier, the amplidyne and the electric timer constitute no portion of the present invention, and these may be standard units. For instance, an electronic motor control similar to the General Electric Thymotrol may be used in place of the amplidyne diagrammatically shown in the drawing. Such a Thymotrol would act at designated intervals to slow down the cut-off drive motor but allow it to drive at base speed during cutting operation through the value of the reference tubes.

In operation of the machine, the double rheostat controls both the motor 12 and the motor 18, so that when the motor 12 is stopped or started the motor 18 will likewise stop or start, and any variation in the speed of one motor will be directly proportional to the base speed of the other, and the speed of the cutter at the instant of cutting will always be the same as the speed of the sheet. For cutting different sheet lengths the pointer 39 of the potentiometer 31 is moved to the point on the scale indicating the length of the sheet to be cut. The electric timer operates to permit the motor 18 to drive the cutter at base or sheet speed once during each complete rotation of the cutters, but to slow down the motor to varying degrees and then accelerate it between successive cutting operations, the extent of the deceleration and acceleration being controlled by the position of the pointer. In other words, the position of the pointer 39 determines the frequency at which the cutter makes a complete revolution, and the electric timer acts to alternately slow down and speed up the motor so that regardless of the time cycle of the cutter, the cutter blades will always travel at sheet speed while cutting. For sheets of one particular length, for instance the shortest, the timer may not effect any introduction of the resistor to the circuit, and the cutters may rotate at constant speed. For other sheet lengths the resistor is in series for such a time period as to effect the desired speed reduction between successive cutting operations.

The details of the amplifier, the amplidyne and the electric timer constitute no portion of the present invention and these may be standard units.

The timer may be of the General Electric vacuum tube type CR7504-A3A such as disclosed in the Schneider Patent 2,171,347, and the amplidyne may be of the well known General Electric type such as that disclosed in the Alexanderson Patent 2,227,992. Various other types of timers and other electrical units may be employed to control the time cycle and the required deceleration and acceleration during each time cycle.

Having thus described my invention what I claim as new and desire to secure by Letters Patent is:

1. An apparatus for producing sections of predetermined length and of comparatively stiff sheet material, including means for continuously advancing the sheet material at a substantially uniform speed, a cutting mechanism having a cutter traveling with and at the same time as the sheet material during the cutting action, an electric motor for driving the sheet advancing means, a separate electric motor for driving said cutting mechanism, and means for alternately accelerating and decelerating said last mentioned motor between successive sheet cutting operations.

2. A machine for making stiff sheets of preselected length, including a mechanism for continuously producing and advancing the sheet material, an electric motor for driving said mechanism, a cutting mechanism for acting on said material and adjustable to give said preselected length, a separate electric motor for said last mentioned mechanism, a double rheostat for simultaneously varying the speeds of both motors, and means in series with one part of said double rheostat for accelerating and decelerating said last mentioned motor to vary said length.

3. A machine for making stiff sheets of preselected length, including a mechanism for continuously producing and advancing the sheet material, a cutting mechanism having a cutter traveling with and at the same speed as the sheet material during the cutting action and having a variable speed of return movement, an electric motor for driving the first mentioned mechanism, a separate electric motor for driving the second mentioned mechanism, a double rheostat for simultaneously varying the speed of both of said motors and to the same extent, and means in series with one part of said double rheostat for accelerating and decelerating the second mentioned motor to vary the time cycle of the cutting mechanism.

4. A machine for making stiff sheets of preselected length, including a mechanism for continuously producing and advancing the sheet material, a cutting mechanism having a cutter traveling with and at the same speed as the sheet material during the cutting action and having a variable speed of return movement, an electric motor for driving the first mentioned mechanism, a separate electric motor for driving the second mentioned mechanism, means for simultaneously varying the time cycle of both motors and to the same extent, and means independent thereof for decelerating and accelerating said last mentioned motor between successive cutting operations.

5. A machine for making stiff sheets of preselected length, including a mechanism for continuously producing and advancing the sheet material, a cutting mechanism having a cutter traveling with and at the same speed as the sheet material during the cutting action and having a variable speed of return movement, an electric motor for driving the first mentioned mechanism, a separate electric motor for driving the second mentioned mechanism, means for simultaneously varying the time cycle of both motors and to the same extent, and a variable motor control for alternately accelerating and decelerating said last mentioned motor between successive sheet cutting operations.

6. A machine for making stiff sheets, including a mechanism for continuously producing and advancing the sheet material, an electric motor for driving said mechanism, a cutting mechanism for acting on said material and adjustable to give a preselected length of sheet, a separate electric motor for said last mentioned mechanism, a double rheostat for simultaneously varying the basic speeds of both motors, a variable motor control in series with the rheostat governing the motor on the cutting mechanism for accelerating and decelerating said motor in a predetermined cyclic operation to control the length of the stiff sheets being produced, and an indexed adjustable timer means for setting the cycle of operation for varying said sheet length.

7. An apparatus for producing sections of predetermined length and of comparatively stiff sheet material, including means for continuously advancing the sheet material at a substantially uniform speed, a cutting mechanism having a cutter traveling with and at the same speed as the sheet material during the cutting action, an electric motor for driving the sheet advancing means, a separate motor for driving said cutting mechanism, a pilot generator driven by the motor on the sheet advancing means for maintaining the basic motor speed in said second mentioned motor, a variable motor speed control for accelerating and decelerating said last mentioned motor between successive sheet cutting operations, and an adjustable timer for accurately controlling the cyclic operation of the cutting mechanism.

8. A machine for making stiff sheets of preselected length, including a mechanism for continuously producing and advancing the sheet material, a cutting mechanism having a cutter traveling with and at the same speed as the sheet material during the cutting action and having a variable speed of return movement, an electric motor for driving the first mentioned mechanism, a separate electric motor for driving the second mentioned mechanism, a pilot generator driven by the first mentioned motor for generating a reference current applied to the control circuit of the motor on the cutting mechanism, a double rheostat for simultaneously varying the basic speed of both of said motors and to the same extent, a variable motor control interposed between the motor driving the cutting mechanism and its rheostat for accelerating and decelerating the last mentioned motor to vary the time cycle of the cutting mechanism, and an adjustable timer for controlling the cyclic operation of the variable motor control in accelerating and decelerating the cutting mechanism motor and bringing said cutting mechanism to sheet material speed during the cutting action by the reference current set up in the variable motor control by the pilot generator driven by the first mentioned motor.

9. A cut-off mechanism for continuously advancing material, including a pair of rotary knives operatively geared together, a drive motor geared to said knives, a basic speed regulating rheostat, a variable motor control interposed between said rheostat and motor for variable cyclic operation of said motor, and a variable motor control timer for accurate control of said variable cyclic motor operation.

10. In a shearing mechanism, the combination of a pair of rotary knives operatively connected, a variable speed motor directly connected to said rotary knives, a rheostat for establishing a basic speed for said motor, a variable motor drive control interposed between the basic speed regulating rheostat and the motor for maintaining the original basic speed of said motor or causing an accelerated and decelerated motion of the motor where desired in a predetermined cycle of operation, and an adjustable timer for controlling the time period of the motor speed oscillation in conformity with the said cyclic operation.

11. A cut-off mechanism having a pair of rotary knives operatively connected for rotation in opposite directions about fixed axes, a variable speed motor geared directly to said rotary knives, a rheostat for establishing a basic speed for said motor, and a variable motor drive control interposed between the basic speed regulating rheostat and the motor to accelerate and decelerate said motor, as desired, in a predetermined cycle of operation.

12. In a cut-off mechanism, a pair of rotary knives operatively geared together, in combination with a drive motor geared to said knives, a variable motor drive control for imparting a variable or a constant speed to said motor in a predetermined cycle of operation, and an adjustable timer means to control said predetermined cycle of operation.

13. A cut-off mechanism having a pair of rotary knives operatively geared together, in combination with a drive motor geared to said knives and a variable motor drive control for imparting a variable speed to said motor in each cycle of cutting operation.

HERBERT C. BEHRENS.